United States Patent [19]

Amneus

[11] 4,349,129
[45] Sep. 14, 1982

[54] PORTABLE, MEASURED VOLUME DISPENSER

[75] Inventor: John S. Amneus, Cincinnati, Ohio

[73] Assignee: The Procter & Gamble Company, Cincinnati, Ohio

[21] Appl. No.: 99,243

[22] Filed: Dec. 3, 1979

[51] Int. Cl.$^3$ .............................................. B67D 5/06
[52] U.S. Cl. ...................................... 222/41; 222/205; 222/206; 141/26
[58] Field of Search ................. 222/205, 206, 207, 41; 141/24, 2, 20.5, 18, 380, 26, 21, 25; 128/233; 401/185

[56] References Cited

U.S. PATENT DOCUMENTS

| | | | |
|---|---|---|---|
| 398,528 | 2/1889 | Molin | 222/205 |
| 531,133 | 12/1894 | Pomeroy | 141/24 |
| 1,203,919 | 11/1916 | Simpson | 141/24 |
| 1,447,790 | 3/1923 | Kovacs | 141/24 |
| 2,183,662 | 12/1939 | Warr et al. | 222/205 X |
| 2,311,367 | 2/1943 | Chambers . | |
| 2,599,448 | 6/1952 | Greene . | |
| 2,911,972 | 11/1959 | Elinger | 215/1 C |
| 3,089,623 | 5/1963 | Padzieski . | |
| 3,100,068 | 8/1963 | Kersten . | |
| 3,171,446 | 3/1965 | Koch | 141/24 |
| 3,203,454 | 8/1965 | Micallef | 222/205 X |
| 3,254,809 | 6/1966 | Breneman . | |
| 3,256,549 | 6/1966 | Evesque | 15/552 |
| 3,266,532 | 8/1966 | Stewart | 141/24 |
| 3,379,196 | 4/1968 | Mitchell | 141/24 X |
| 3,396,875 | 8/1968 | Finch . | |
| 3,481,678 | 12/1969 | Schwartzman | 401/206 |
| 3,938,514 | 2/1976 | Boucher | 222/206 X |
| 4,033,479 | 7/1977 | Fletcher et al. | 222/61 |
| 4,079,859 | 3/1978 | Jennings . | |
| 4,105,142 | 8/1978 | Morris, Jr. | 222/158 |
| 4,133,614 | 1/1979 | Baginski et al. . | |
| 4,157,768 | 6/1979 | Britt . | |

FOREIGN PATENT DOCUMENTS

| | | | |
|---|---|---|---|
| 224851 | 12/1962 | Australia | 141/18 |
| 1459735 | 10/1966 | France | 222/207 |
| 807145 | 1/1959 | United Kingdom | 141/18 |

Primary Examiner—Joseph J. Rolla
Assistant Examiner—Frederick R. Handren
Attorney, Agent, or Firm—Milton B. Graff, IV; John V. Gorman; Richard C. Witte

[57] ABSTRACT

A portable dispenser is described which is adapted to mount removably on a bottle pump tube. A desired volume of liquid from the bottle is pumped into the interior of the dispenser. The dispenser is then removed from the tube and the measured amount of liquid is dispensed. In one embodiment, two dispensing devices are sequentially activated to dispense the measured amount of liquid.

1 Claim, 5 Drawing Figures

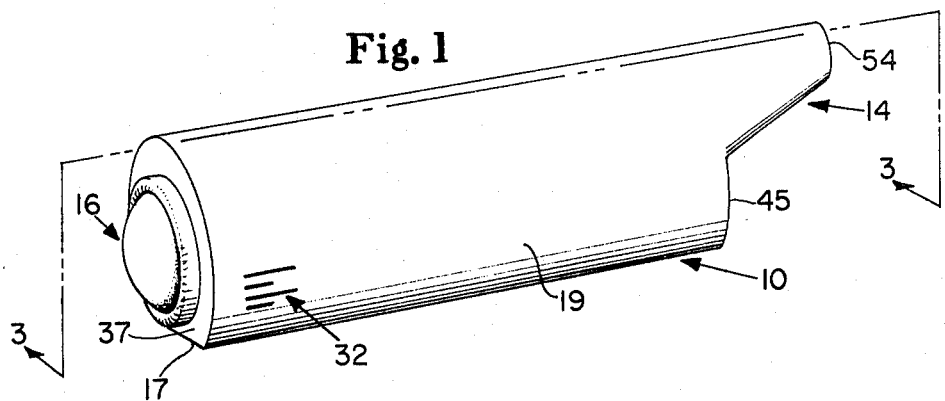
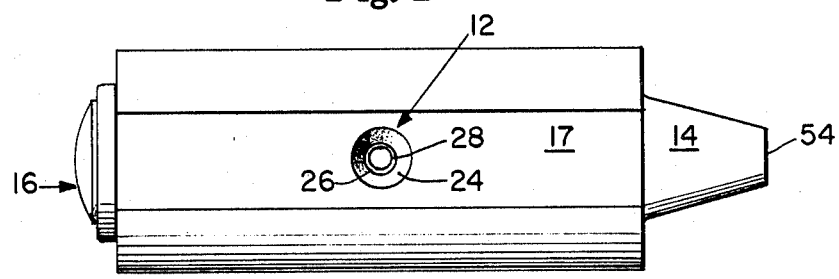
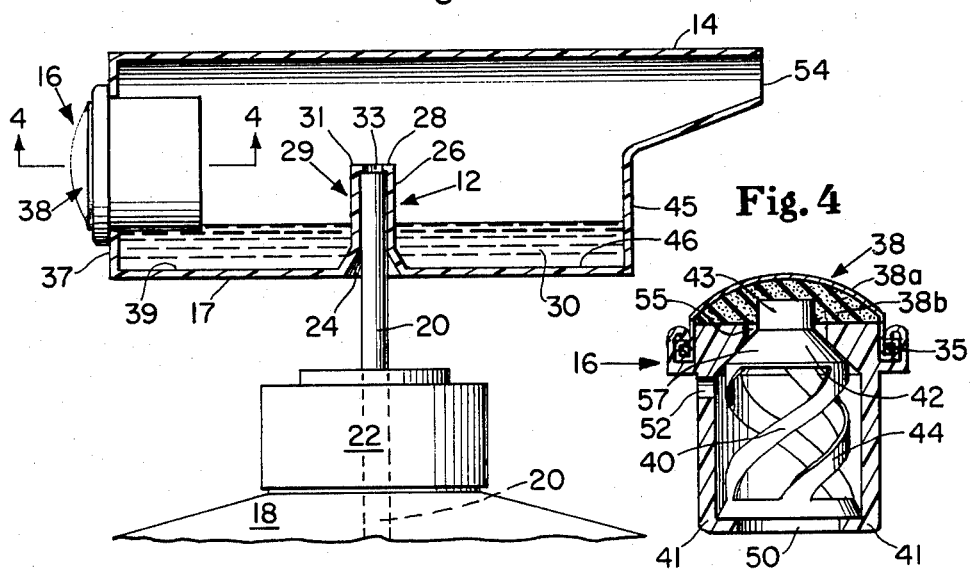

PORTABLE, MEASURED VOLUME DISPENSER

TECHNICAL FIELD

This invention relates to a portable means for dispensing a measured volume of liquid. More specifically, the invention is a portable device removably connected to a source of liquid laundry detergents from which a measured supply is received to be subsequently dispensed into a washing machine.

BACKGROUND ART

Many prior efforts have been made to dispense a small measured quantity of liquid from a large liquid container such as a bottle of detergent. These prior efforts have generally required, to fill a measuring reservoir, either tilting of a large bottle or squeezing of a bottle which although larger than the dispenser is usually hand-sized. In either case transportation of the large bottle to the place where the liquid is needed is required.

The measuring dispensers requiring large bottle tilting generally have a measuring cup integral with the bottle located in the top of the bottle. Representative of these structures is U.S. Pat. No. 3,396,875 issued to Finch on Aug. 13, 1968 and U.S. Pat. No. 4,079,859 issued to Jennings on Mar. 21, 1978. Other prior efforts have made the measuring cup which is filled by tilting the bottle removable from the bottle, but use screw attachment of the measuring cup to the liquid source bottle. An example is U.S. Pat. No. 3,254,809 issued to Breneman on June 7, 1966. Removal of the filled measuring reservoir by unscrewing is inconvenient and is not suggested by the Breneman reference.

The second way a measured quantity has been dispensed from a large liquid container such as a bottle is to use a hand graspable squeeze bottle. By squeezing the bottle a quantity of liquid exits up a dip tube into a top mounted measuring cup. Indicative of this approach are U.S. Pat. No. 4,157,768 issued to Britt on June 12, 1979 and U.S. Pat. No. 3,089,623 issued to Padzieski issued on May 14, 1963. In these patents the measuring cup described is attached to the bottle by a threaded connection. Again removal of the filled measuring reservoir by unscrewing is impractical. The bottle most conveniently is carried to the site of dispensing and the size of the bottle is limited.

Portability is not an aim of these prior efforts and where the measuring container is removable it is attached to the bottle by screw threads, and the measuring cup is not removed from the bottle in use. U.S. Pat. No. 3,100,068 issued to Kersten on Oct. 11, 1960 discloses a squeeze bottle connected to a source of liquid by means of an internally seated, ribbed, outlet valve 12 which plugs into a flexible liquid supply tube 14 and the dispenser 11. Thus, the squeeze dispenser, which has only one dispensing means, grippingly engages the liquid source container.

The prior art fails to teach a conveniently portable dispenser which allows easy removal from the supply of liquid for application of the liquid at the location where it is needed to avoid lugging a heavy bottle with the dispenser. Nor does the prior art teach such a device with means for dispensing a measured quantity of liquid in more than one way. This is desirable where, as with liquid laundry detergents, it is desirable to first use part of a measured volume of liquid in one way, such as to pretreat particularly soiled spots on clothing and then to dispense the remaining liquid in another way, such as to pour the remaining detergent into the washing machine load. Moreover no means is taught to allow selective dispensing which requires use of only one hand. Finally the prior art fails to teach a means which allows dispensing of a measured volume from a large container of liquid without tilting, lifting or squeezing the container. It is the objective of this invention to solve these deficiencies in past practice.

DISCLOSURE OF THE INVENTION

Disclosed herein is a portable, hand-held liquid dispenser capable of dispensing a measured volume of liquid in at least two portions by different dispensing outlets. The dispenser is particularly suitable for dispensing liquid laundry detergent wherein a portion of the volume is applied directly to soiled spots on clothing to be washed and the remainder of the volume is poured into the washing machine tub. The dispenser includes a liquid receptacle for holding a measured volume of liquid and a liquid inlet communicating with the interior of the liquid receptacle. The liquid inlet is adapted for telescopic engagement with a source of liquid to be dispensed. A valved dispensing outlet communicates with the receptacle and a pour dispensing outlet also communicates with the receptacle. The pour dispensing outlet is inoperative when liquid is being admitted to the dispenser and also when the valved dispensing outlet is operating.

BRIEF DESCRIPTION OF THE DRAWINGS

FIG. 1 is a perspective view of one embodiment of this invention.

FIG. 2 is a bottom elevational view of the same embodiment shown in FIG. 1.

FIG. 3 is a fragmentary, partial sectional view taken along line 3—3 of the dispenser of FIG. 1, shown mounted on a bottle.

FIG. 4 is an enlarged, partially sectioned elevational view taken along the line 4—4 of FIG. 3.

DETAILED DESCRIPTION OF THE INVENTION

Figure 5:
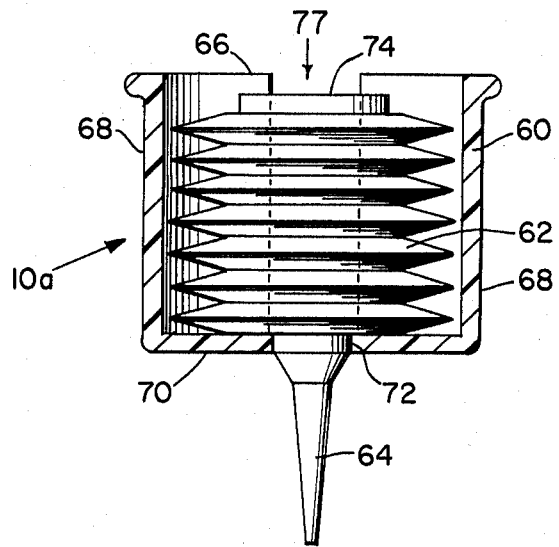
FIG. 5 is a partially sectioned elevational view of another embodiment.

Referring to the drawings wherein like reference characters are utilized for like parts throughout the several views, there is illustrated in FIG. 1 a generally tubular dispenser 10 with a flattened bottom 17, a central region 19 and end walls 37 and 45, sized to be easily grasped in one hand from above. The shape adopted for the dispenser, however, is amenable to much variation so as to function optimally in a given operating situation. Preferably the dispenser 10 is made of a rigid, transparent material. Dispenser 10 has a filling port 12, a pour spout 14, and a dauber 16.

The dispenser 10 is adapted for temporary mounting on a bottle 18, as shown in FIG. 3. The bottle 18, which is conventional, preferably includes a pump tube 20 extending from a point near the bottom of the bottle through the bottle interior and exiting from screw cap 22 so as to extend a short distance above the remainder of the bottle 18. The tube 20 must extend sufficiently above the rest of the bottle to allow the tube with the dispenser mounted on it to be reciprocated in order to pump the liquid from the bottle. The pump tube 20 can be any conventional pump tube except that the conventional spray nozzle normally placed atop the tube to produce a horizontal spray is omitted. Reciprocation of the portion of the tube extending above the bottle pumps liquid in spurts from the bottle, as is well known.

Any conventional means of filling the dispenser can be used, however. It is preferred that tilting or lifting the bottle 18 be avoided. When the size and flexibility of the bottle 18 permits, the dispenser can be filled by squeezing the bottle, causing liquid to flow into the dispenser through a dip tube (not shown) known in the art which can be used to replace the pump tube 20, discussed above. Conversely, if the dispenser 10 is made suitably flexible it can serve when squeezed to pump the liquid from the bottle.

The tube 20 slides into funnel-shaped filling port 12 of dispenser 10. Filling port 12 has an outermost conical region 24 which converges into a tubular region 26 as it extends into the interior of the dispenser. The port 12 is recessed and the bottom 17 of dispenser surrounding it is flat so that dispenser 10 will be stable when rested on its bottom 17. The diameter of the tubular region 26 is preferably slightly larger than the outside diameter of the tube 20 so as to allow the tube 20 to slide freely into the filling port 12 guided initially by the conical region 24 and slipping easily into and out of tubular region 26. The inward travel of the tube 20 is arrested by annular stop 28 which extends inward radially from the tubular portion 26 at the innermost extension 31 of the filling port 12. The weight of the dispenser 10, which is preferably small, is carried by the tube 20 through stop 28. Since the dispenser is supported atop tube 20 it is desirable that the tube extend a substantial distance into the dispenser so that the dispenser is stable atop the tube 20. Preferably the stop 28 is no wider than the tube 20 wall thickness so as not to occlude liquid passage out of the tube 20.

Liquid can then be pumped into the lowermost portion of the dispenser 10 by means of pump tube 20. This is accomplished simply by grasping the dispenser 10 and reciprocating it up and down causing pump tube 20 to be reciprocated so that fluid is pumped through tube 20 into the dispenser interior where it flows down the inner surface 29 of filling port 12. The liquid collects in liquid receptacle 30 of dispenser 10 as shown in FIG. 3. Receptacle 30 is the lowermost cup-shaped portion of the dispenser 10. The uppermost extreme of receptacle 30 is defined by the innermost extension 31 of filling port 12. If the liquid level rises above this point it will leak out orifice 33 when tube 20 is removed. Preferably the innermost extension 31 of filling port 12 is located near the center of the hollow dispenser.

By this pumping action the receptacle 30 is filled with a measured volume of the liquid to be dispensed. Preferably the dispenser 10 is transparent and contains indicia 32 so that the user can determine when the desired volume is contained within receptacle 30. However, the pump tube 20 may also be used to measure the desired volume. For example, it may be known that one or two full pumps will achieve the desired volume.

The measured volume contained in receptacle 30 can then be dispensed in one of two ways. The volume can be dispensed in whole or in part by means of dauber 16 or in whole or in part by pour spout 14. For example, a portion of the measured volume may first be dispensed via dauber 16 and the remainder dispensed via pour spout 14.

The dauber 16 communicates with receptacle 30 by way of interior surface 39 situated between dauber 16 and port 12. The dauber conveniently is friction fitted into an appropriate opening in the dispenser. As shown in FIG. 3, the dauber is situated in end wall 37 of the tubular dispenser. The preferred dauber 16 is shown in FIG. 3 of U.S. Pat. No. 4,133,614, issued on Jan. 9, 1974 to Baginski et al.; that patent is hereby expressly incorporated by reference herein. Briefly, the dauber, shown in FIG. 4, includes a flexible, absorbent outer cover 38, preferably retained by an O-ring 35, a spring biased valve 40 and a valve seat 41. Spring biased valve 40 includes a conical valve plug 42 and spring 44 which preferably are integral. Valve plug 42 includes a truncated conical portion 57 and a tubular actuator portion 43, whose diameter is less than that of the valve seat 41 in the vicinity so as to create an annular passageway 55. Spring 44 is retained between valve seat 41 and valve plug 42. In the preferred duaber, the absorbent cover 38 has a woven fabric outer layer 38a and an absorbent foam inner layer 38b.

In the closed position of the valve a seal is maintained between the valve seat 41 and conical portion 57. When the dauber is pressed against a surface, valve plug 42 is caused to move away from the surface into the dispenser, breaking the seal between seat 41 and conical portion 57, compressing spring 44, and allowing liquid which enters via orifices 50 and 52 to leak between valve seat 41 and valve plug 42 to be absorbed by cover 38. The pressure of the absorbent cover 38 against the surface to be treated causes the surface against which the dauber is pressed to be wetted. When the dispenser is withdrawn from the surface to be treated, the spring 44 causes the plug 42 to move back to its original position shutting off the flow of liquid.

It should be clear that any conventional dispensing means could be used in place of the dauber 16 to suit the requirements of a particular situation. Even a small orifice may be suitable in many applications. Preferably the dispensing means utilized is valved so that the outflow of liquid is easily controllable and accurately directable. Other suitable valved dispensing means include sprayers and direct applicators which apply liquid directly to a surface to be treated such as resilient closures with slits or orifices which are biased open when pressed against a surface, commonly used on mucilage bottles.

A pour spout 14, preferably located in the end wall 45 opposite dauber 16, communicates with receptacle 30 by way of interior surface 46 located between port 12 and spout 14. The spout 14 converges as it extends away from the receptacle 30. The orifice 54 of the converging pour spout is open allowing unhampered egress of fluids from reservoir 30 upon tilting of the dispenser 10. By extending the spout away from the center of dispenser, the chance of accidental spill from the interior is lessened, so that no closure is needed on pour spout 14. Obviously, though, a closure could be provided for pour spout 14. Other dispensing means may be used in place of pour spout 14 to suit special needs.

It is preferred that the pour spout 14 and the dauber 16 be spaced from one another around the periphery of the dispenser 10. In addition the orifice 54 of pour spout 14 must be positioned above the liquid level when the dispenser is in the filling position shown in FIG. 3. By so arranging the filling port 12, the pour spout 14 and dauber 16 the various dispensing means can be selectively primed by rotation of the dispenser. To activate dauber 16 in the embodiment pictured in FIG. 1 the dispenser 10 is rotated 90° counterclockwise. This causes the liquid in receptacle 30 to travel over surface 39 to a position where the orifices 50 and 52 of dauber 16, now pointing downwardly, are submerged under the liquid contained in the dispenser. Now primed, the dauber valve 40 is activated by pressing cover 38 against a surface, as described above, allowing liquid to flow out by gravity. The pour spout 14 and filling port 12, thus are most desirably arranged to be above the liquid level when the dispenser is rotated to its dauber dispensing position. To activate the pour spout 14, that is to pour the liquid from the dispenser, the dispenser is rotated clockwise so that liquid flows from receptacle 30 over surface 46 and out spout 14. If the filling port 12 extends sufficiently far into the interior of the dispenser, no liquid will leak out the inlet during rotation. If leakage is a problem, a valve can be incorporated into port 12. When an unvalved dispensing outlet is used in place of dauber 16, this dispensing outlet also is preferably arranged to be above the liquid level in both the filling and pouring modes.

In operation the device works as follows. Dispenser 10 is grasped from above with palm pointed downwardly, and filling port 12 is slid over pump tube 20 mounted in a bottle or other source of liquid. The dispenser 10 is then reciprocated vertically to pump a quantity of fluid into the dispenser 10. Preferably the pump action is continued until the liquid reaches a desired level as determined by indicia 32 located on the side of the dispenser 10. The dispenser 10 is then raised off of the tube 20 and taken to any desired location. When needed for direct application to a surface, the dispenser can be rotated counterclockwise to submerge the orifices 50 and 52 of the dauber 16. The cover 38 of dauber 16 can then be pressed against the surface to be treated causing a flow of liquid onto the surface. Alternatively, or subsequent to the surface treatment just described, dispenser 10 can be rotated clockwise until the remaining liquid within the dispenser 10 is drained through spout 14 and directed as the user desires. In this way filling, applicating and pouring can be accomplished with only one hand without requiring the users to reposition their grasp of the dispenser in use. When the dispenser is used to dispense liquid laundry detergent the dauber is useful to apply the detergent directly to badly soiled spots on the laundry. The remaining detergent is then poured into the washing machine basin via spout 14. By this procedure no more than the measured amount of liquid is applied to the wash cycle regardless of the way the liquid is dispensed.

In another embodiment of this invention, pictured in FIG. 5, a common inlet and outlet is utilized. The hand sized dispenser 10a includes a cup-like frame 60 and a bellows 62 having a tapered inlet/outlet tube 64. The cup-like frame 60 has an open top 66, a cylindrical lateral periphery 68 and a flat base 70. The inlet/outlet tube 64 passes through an opening 72 in the base 70 of the frame 60. The bellows 62 and frame 60 may be adhesively connected where the tube 64 passes through opening 72. The end of tapered inlet/outlet tube 64 telescopes within pump tube 20 (not shown).

To operate the dispenser 10a the bellows 62 is first completely compressed. While maintaining the bellows in a compressed state, tapered inlet/outlet tube 64 is slid into pump tube 20 until a snug fit is achieved and a seal created between the interior of pump tube 20 and the exterior of tapered inlet/outlet tube 64. The dispenser 10a is then grasped in the palm of the hand so that the thumb extends over the dispenser 10a and the fingers wrap around the lateral periphery 68 of the frame 60. The dispenser 10a is vertically reciprocated on pump tube 20 causing liquid to be pumped into the bellows 62 through tapered inlet/outlet tube 64. Reverse flow out of the bellows 62 is prevented by one-way valves (not shown) in the conventional pump tube 20.

As liquid begins to fill the bellows 62 the bellows expands upwardly, guided by frame 60. If the frame 60 is transparent, indicia, not shown, can conveniently be marked on the exterior of lateral periphery 68 so that the extent of vertical expansion of bellows 62 can be used to measure the amount of liquid held within the bellows 62. When the desired amount of liquid has been pumped into the dispenser 10a, it is slid off pump tube 20.

The liquid held in the dispenser 10a is dispensed by pointing the inlet/outlet tube 64 as desired and squeezing the bellows 62 causing liquid to exit at a rate determined by the pressure applied. Preferably, the bellows 62 is squeezed by pressing downwardly on its top 74 through the open top 66 of frame 60 with the thumb of the hand grasping the dispenser 10a. If desired, the frame 60 can have a thumb sized slot 77, as shown in FIG. 5, extending from top 66 to base 70 of frame 60 to facilitate the downward compression of the bellows 62 by the thumb.

Thus, the dispenser 10a permits filling and applicating with one hand without any need to reposition one's grasp on the dispenser. Since the user can adjust the rate of outflow of liquid from the dispenser 10a by varying the pressure on the bellows 62, the dispenser is adaptable to a variety of functions including pretreatment of laundry with liquid laundry detergent as discussed previously.

While particular embodiments of the present invention have been illustrated and described, it will be obvious to those skilled in the art that various changes and modifications can be made without departing from the spirit and scope of the invention and it is intended to cover, in the appended claims, all such modifications that are within the scope of this invention.

What is claimed is:

1. A portable liquid dispenser for dispensing a measured volume of liquid, said dispenser comprising: a reciprocatable pump tube affixed to a bottle containing the liquid and adapted to pump the liquid through the tube interior and its upper end when reciprocated; a liquid applicator, said applicator being mountable on said pump tube but being freely removable therefrom, said applicator having a squeezable bellows for holding said measured volume of liquid to be dispensed, said bellows having a common inlet/outlet tube shaped to conform to the end of said pump tube, said inlet/outlet tube being capable of free sliding telescopic connection and disconnection with said pump tube; said bellows being surrounded by a cup-like frame having an open top, a cylindrical lateral periphery, and a flat base, said inlet/outlet tube passing through an opening in said base, said frame being transparent and having indicia marked on the exterior of said lateral periphery to measure the expansion of said bellows, said frame having a thumb-sized slot extending from said open top to said base of the frame.

* * * * *